US011102137B2

(12) United States Patent
Sung et al.

(10) Patent No.: US 11,102,137 B2
(45) Date of Patent: Aug. 24, 2021

(54) APPARATUS AND METHOD FOR PROCESSING DATA PACKET OF ELECTRONIC DEVICE

(71) Applicant: Samsung Electronics Co., Ltd., Gyeonggi-do (KR)

(72) Inventors: Jinmo Sung, Gyeonggi-do (KR); Joonyoung Heo, Gyeonggi-do (KR); Mooyoung Kim, Gyeonggi-do (KR); Minjung Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/511,538

(22) Filed: Jul. 15, 2019

(65) Prior Publication Data
US 2020/0021533 A1    Jan. 16, 2020

(30) Foreign Application Priority Data

Jul. 13, 2018 (KR) .................. 10-2018-0081520

(51) Int. Cl.
*H04L 12/835* (2013.01)
*H04L 29/06* (2006.01)
(Continued)

(52) U.S. Cl.
CPC ............. *H04L 47/30* (2013.01); *H04L 47/36* (2013.01); *H04L 49/9021* (2013.01); *H04L 69/161* (2013.01); *H04W 28/065* (2013.01)

(58) Field of Classification Search
CPC .................. H04L 49/9021; H04L 49/9005
See application file for complete search history.

(56) References Cited

U.S. PATENT DOCUMENTS 6,003,089 A *  12/1999  Shaffer .................. H04L 47/36
                                                                370/232
6,359,877 B1 *  3/2002  Rathonyi .............. H04W 28/06
                                                                370/349
(Continued)

FOREIGN PATENT DOCUMENTS

KR          100489685         5/2005

OTHER PUBLICATIONS

International Search Report dated Oct. 16, 2019 issued in counterpart application No. PCT/KR2019/008109, 7 pages.
"Kernel tuning for multi-core scaling of load balancers and cache servers under Linux", https://blog.yuuk.io/entry/linux-networkstack-tuning-rfs, Mar. 31, 2015, pp. 22.

(Continued)

*Primary Examiner* — Raj Jain
(74) *Attorney, Agent, or Firm* — The Farrell Law Firm, P.C.

(57) ABSTRACT

Disclosed is an electronic device including a wireless communication modem, at least one processor connected with the communication modem and comprising a plurality of cores, and a nonvolatile memory operatively connected with the processor, wherein the nonvolatile memory stores instructions that cause a first core of the processor to receive first data packets having a first size from the wireless communication modem, and to transmit at least a portion of the first data packets to a second core of the processor, and that cause the second core to receive the at least a portion of the first data packets from the first core, to merge the at least a portion of the first data packets into a plurality of second data packets having sizes larger than the first size, based at least in part on a type of the first data packets, and to transmit the second data packets to at least one other core of the processor than the first core and the second core.

13 Claims, 12 Drawing Sheets

(51) Int. Cl.
    *H04W 28/06*     (2009.01)
    *H04L 12/805*     (2013.01)
    *H04L 12/883*     (2013.01)

(56) References Cited

U.S. PATENT DOCUMENTS

| | | | |
|---|---|---|---|
| 6,631,422 | B1 | 10/2003 | Althaus et al. |
| 9,191,994 | B2* | 11/2015 | Royz .................... H04W 88/10 |
| 9,356,866 | B1 | 5/2016 | Sivaramakrishnan et al. |
| 9,674,088 | B1* | 6/2017 | Sivaramakrishnan .. H04L 45/38 |
| 2003/0231627 | A1 | 12/2003 | John et al. |
| 2004/0165613 | A1 | 8/2004 | Kim et al. |
| 2009/0310685 | A1 | 12/2009 | Schmidt et al. |
| 2011/0064084 | A1* | 3/2011 | Tatar ................... H04L 49/1546 370/392 |
| 2012/0266181 | A1 | 10/2012 | Carney et al. |
| 2015/0301975 | A1* | 10/2015 | Garg .................. G06F 13/4068 710/105 |
| 2016/0196222 | A1 | 7/2016 | Shajit et al. |
| 2019/0045421 | A1* | 2/2019 | Shah ..................... H04W 40/02 |
| 2020/0021533 | A1* | 1/2020 | Sung ...................... H04L 47/30 |

OTHER PUBLICATIONS

"Understanding the TCP/IP network stack", https://d2.naver.com/helloworld/47667, Apr. 26, 2012, pp. 66.

Kim, Dojung et al., "Linux Routing Performance Enhancement by Shortening Software Interrupt Service Routine", Jun. 22, 2012, pp. 4.

Instruments Help, Copyright 2019 Apple Inc., https://help.apple.com/instruments/mac/current/, pp. 1.

"Correct Monitoring of Windows Processes on multi-core machines", Copyright 2019 AdRem Software, Apr. 26, 2019, https://www.adremsoft.com/blog/view/blog/6703603919139/correct-monitoring-of-windows-processes-on-multicore-machines, pp. 6.

Emma Baccour et al., "A Survey of Wireless Data Center Networks", 49th Annual Conference on Information Sciences and Systems (CISS), Mar. 18, 2015, 6 pages.

Tomaz Buh et al., "Adaptive Network-traffic Balancing on Multi-core Software Networking Devices", Computer Networks, Apr. 29, 2014, 10 pages.

European Search Report dated Feb. 8, 2021 issued in counterpart application No. 19833609.1-1213, 10 pages.

* cited by examiner

APPARATUS AND METHOD FOR PROCESSING DATA PACKET OF ELECTRONIC DEVICE

CROSS-REFERENCE TO RELATED APPLICATION(S)

This application is based on and claims priority under 35 U.S.C. § 119 to Korean Patent Application No. 10-2018-0081520, filed on Jul. 13, 2018, in the Korean Intellectual Property Office, the disclosure of which is incorporated herein by reference in its entirety.

BACKGROUND

1. Field

The disclosure relates generally to an electronic device, and more particularly, to a data packet processing apparatus and method of an electronic device which can process received data packets at high speed.

2. Description of Related Art

An electronic device may process various types of large data packets of contents, such as high-resolution images, videos, and music, while communicating with other electronic devices.

The electronic device may receive large data packets of high speed through a high-speed communication modem. For example, $5^{th}$ generation (5G) mobile communication may provide high throughput, such as 2 gigabits per second (Gbps)-10 Gbps, and low-delay communication services, compared to $4^{th}$ generation (4G) mobile communication. The electronic device may require data packet processing to be able to process received high-speed large data packets without delay. For example, in the case of data packets received in a streaming method, it is highly important for the electronic device to process received data packets without delay.

An electronic device may apply a data packet distribution and data packet merging method to enhance the performance of throughput of data packets, such as a device driver. When the electronic device distributes data packets, there may be a delay in processing the data packets due to the time required to merge the data packets.

As such, there is a need in the art for a method and an apparatus that eliminates such delay in merging of the data packets in the communication system.

SUMMARY

An aspect of the disclosure is to address at least the above-mentioned problems and disadvantages, and to provide at least the advantages described below. Accordingly, an aspect of the disclosure is to provide an apparatus and a method for processing data packets at high speed by classifying types of received data packets and distributing the data packets to a plurality of cores.

Another aspect of the disclosure is to provide an apparatus and a method which can configure a device driver for classifying received data packets and distributing the data packets to a plurality of cores to independently have a configuration to read out received data packets, and a configuration to perform generic receive offload (GRO) and receive packet steering (RPS).

Another aspect of the disclosure is to provide an apparatus and a method which can classify packets of a reception buffer (Rx queue) of a device driver and distribute the packets to a plurality of cores, and enable the plurality of cores to perform GRO and RPS with respect to the respective data packets classified.

In accordance with an aspect of the disclosure, an electronic device includes a wireless communication modem, at least one processor connected with the communication modem and comprising a plurality of cores, and a nonvolatile memory operatively connected with the processor, wherein, when being executed, the nonvolatile memory stores instructions that cause a first core of the processor to receive first data packets having a first size from the wireless communication modem, and to transmit at least a portion of the first data packets to a second core of the processor, and that cause the second core to receive the at least a portion of the first data packets from the first core, to merge the at least a portion of the first data packets into a plurality of second data packets having sizes larger than the first size, based at least in part on a type of the first data packets, and to transmit the second data packets to at least one other core of the processor than the first core and the second core.

In accordance with another aspect of the disclosure, a method for processing data packets of an electronic device includes a first data packet processing operation of distributing received data packets and storing the data packets in backlog queues, and a second data packet processing operation of processing the data packets stored in the backlog queues and delivering the data packets to an upper layer, wherein the first data packet processing operation comprises receiving, by a first core, first data packets having a first size from a wireless communication modem, and transmitting at least a portion of the first data packets to a second core of a processor; and receiving, by the second core, the at least portion of the first data packets from the first core, merging the at least a portion of the first data packets into a plurality of second data packets having sizes larger than the first size, based at least in part on a type of the first data packets, and storing the second data packets in a backlog queue of at least one network stack core.

In accordance with another aspect of the disclosure, an electronic device includes a wireless communication modem, and at least one processor operatively connected with the communication modem and comprising a plurality of cores, wherein the processor comprises a first data packet processing unit configured to process received data packets and to store the data packets in backlog queues, and a second data packet processing unit configured to process the data packets stored in the backlog queues and to deliver the data packets to an upper layer, wherein the first data packet processing unit comprises a first core configured to receive first data packets having a first size from the wireless communication modem, and to transmit at least a portion of the first data packets to a second core of the processor, and the second core configured to receive the at least a portion of the first data packets from the first core, to merge the at least portion of the first data packets into a plurality of second data packets having sizes larger than the first size, based at least in part on a type of the first data packets, and to transmit the second data packets to at least one network stack core.

BRIEF DESCRIPTION OF THE DRAWINGS

The above and other aspects, features, and advantages of certain embodiments of the disclosure will be more apparent

DETAILED DESCRIPTION

Figure 1:
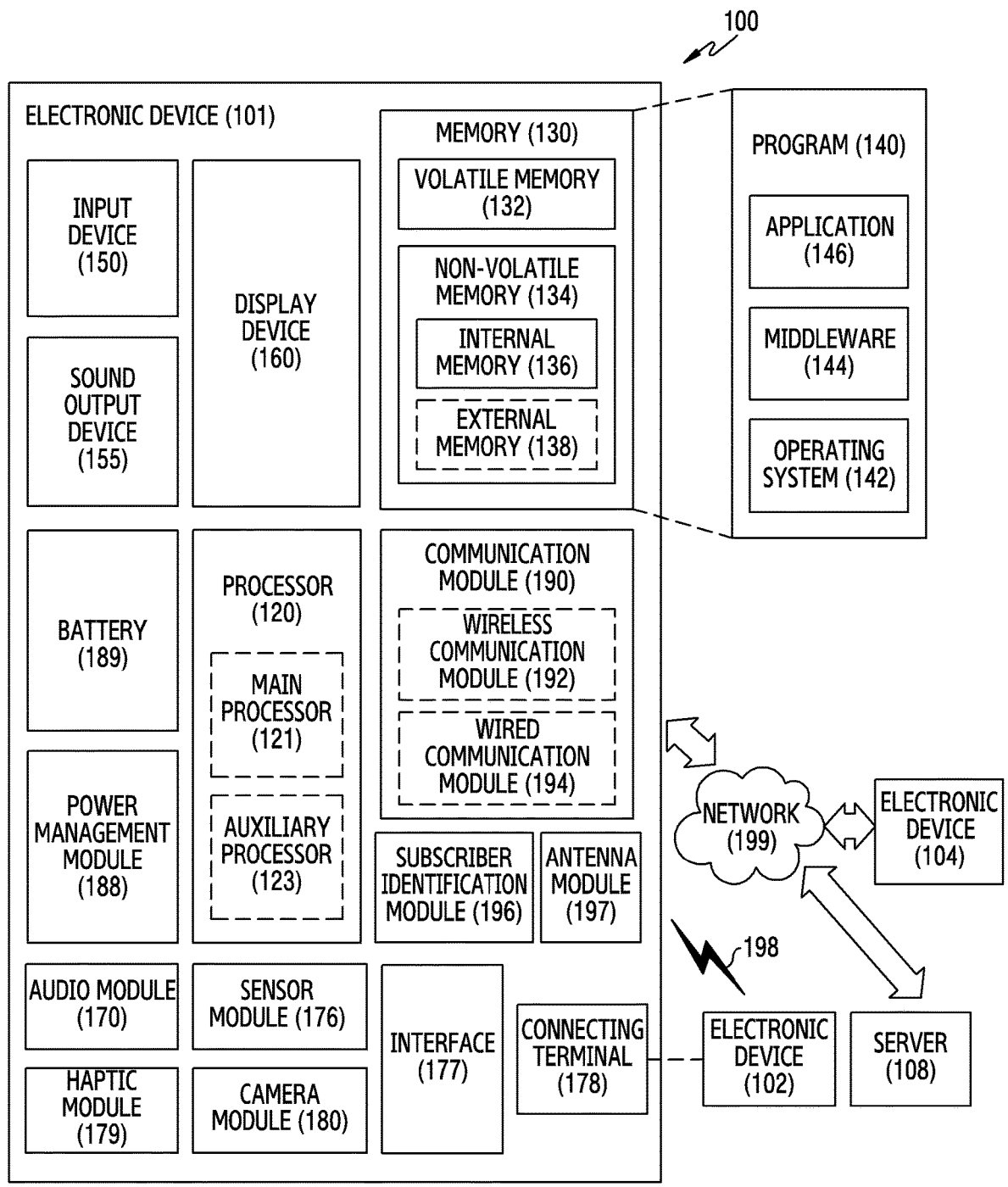
FIG. 1 is a block diagram of an electronic device in a network environment according to an embodiment.

Hereinafter, various embodiments will be described with reference to the accompanying drawings. In the drawings, like reference numerals refer to like elements, and a size of each component may be exaggerated for convenience. Detailed descriptions of known functions and configurations incorporated here will be omitted for the sake of clarity and conciseness.

The terms used herein are not intended to limit the technological features set forth herein to particular embodiments and include various changes, equivalents, or replacements for a corresponding embodiment. It is to be understood that a singular form of a noun corresponding to an item may include one or more of the items, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to distinguish a corresponding component from another, and do not limit the components in importance or order. It is to be understood that if a first element is referred to, with or without the term "operatively" or "communicatively", as "coupled with," "coupled to," "connected with," or "connected to" a second element, the first element may be directly coupled with the second element, such as wiredly or wirelessly, or may be coupled to the second element via a third element.

An electronic device according to embodiments disclosed herein may be various types of devices, such as at least one of a portable communication device (e.g., smartphone) a computer device, a portable multimedia device, a portable medical device, a camera, a wearable device, and a home appliance. The electronic device is not limited to the above-described devices.

FIG. 1 is a block diagram illustrating an electronic device 101 in a network environment 100 according to an embodiment. Referring to FIG. 1, the electronic device 101 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108 and may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160.

The processor 120 may execute a program 140 to control at least one other component, such as a hardware or software component of the electronic device 101 coupled with the processor 120, and may perform various data processing or computation. As at least part of the data processing or computation, the processor 120 may load a command or data received from another component in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be function-specific, and may be implemented as separate from, or as part of the main processor 121.

The auxiliary processor 123 may control at least some of functions or states related to at least one component among the components of the electronic device 101, instead of the main processor 121 while the main processor 121 is in an inactive (e.g., sleep) state, or together with the main processor 121 while the main processor 121 is in an active state. The auxiliary processor 123 may be implemented as part of another component, such as the camera module 180 or the communication module 190, functionally related to the auxiliary processor 123.

The memory 130, which may include the volatile memory 132 and the non-volatile memory 134, may store various data used by at least one component of the electronic device 101. The various data may include the program 140 and input data or output data for a command related thereto. The program 140 may be stored in the memory 130 as software, and may include an operating system (OS) 142, middleware 144, or an application 146.

The input device 150 may receive a command or data to be used by other component of the electronic device 101, from the outside (e.g., a user) of the electronic device 101, and may include a microphone, a mouse, or a keyboard.

The sound output device 155 may output sound signals to the outside of the electronic device 101 and may include a speaker or a receiver. The speaker may be used for general purposes, such as playing multimedia or playing record, and the receiver may be used for an incoming calls. The receiver may be implemented as separate from, or as part of the speaker.

The display device 160 may visually provide information to a user of the electronic device 101 and may include a display, a hologram device, or a projector and control circuitry to control a corresponding one of the display, hologram device, and projector, and touch circuitry adapted to detect a touch, or sensor circuitry (e.g., a pressure sensor) adapted to measure the intensity of force incurred by the touch.

The audio module 170 may convert a sound into an electrical signal and vice versa, and may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device 102 directly (e.g., wiredly) or wirelessly, and may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102 and may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation, and may include a motor, a piezoelectric element, or an electric stimulator.

The camera module 180 may capture a still image or moving images, and may include one or more lenses, image sensors, image signal processors, or flashes.

The power management module 188 may manage power supplied to the electronic device 101, and may be implemented as at least part of a power management integrated circuit (PMIC).

The battery 189 may supply power to at least one component of the electronic device 101, and may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device and performing communication via the established communication channel. The communication module 190 may include one or more communication processors that are operable independently from the processor 120 and supports a direct (e.g., wired) communication or a wireless communication, and may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101 and may include one or more antennas, and, therefrom, at least one antenna appropriate for a communication scheme used in the communication network, such as the first network 198 or the second network 199, may be selected by the communication module 190. The signal or the power may then be transmitted or received between the communication module 190 and the external electronic device via the selected at least one antenna.

At least some of the above-described components may be coupled mutually and communicate commands or data therebetween via an inter-peripheral communication scheme, such as a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be of a same type as or a different type than the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or service related to the request, and transfer an outcome of the performing to the electronic device 101. The electronic device 101 may provide the outcome, with or without further processing of the outcome, as at least part of a reply to the request. To that end, a cloud, distributed, or client-server computing technology may be used, for example.

The electronic device herein may be one of various types, including but not limited to a portable communication device (e.g., a smart phone), a computer device, a portable multimedia device, a portable medical device, a camera, a wearable device, or a home appliance.

Figure 2A:
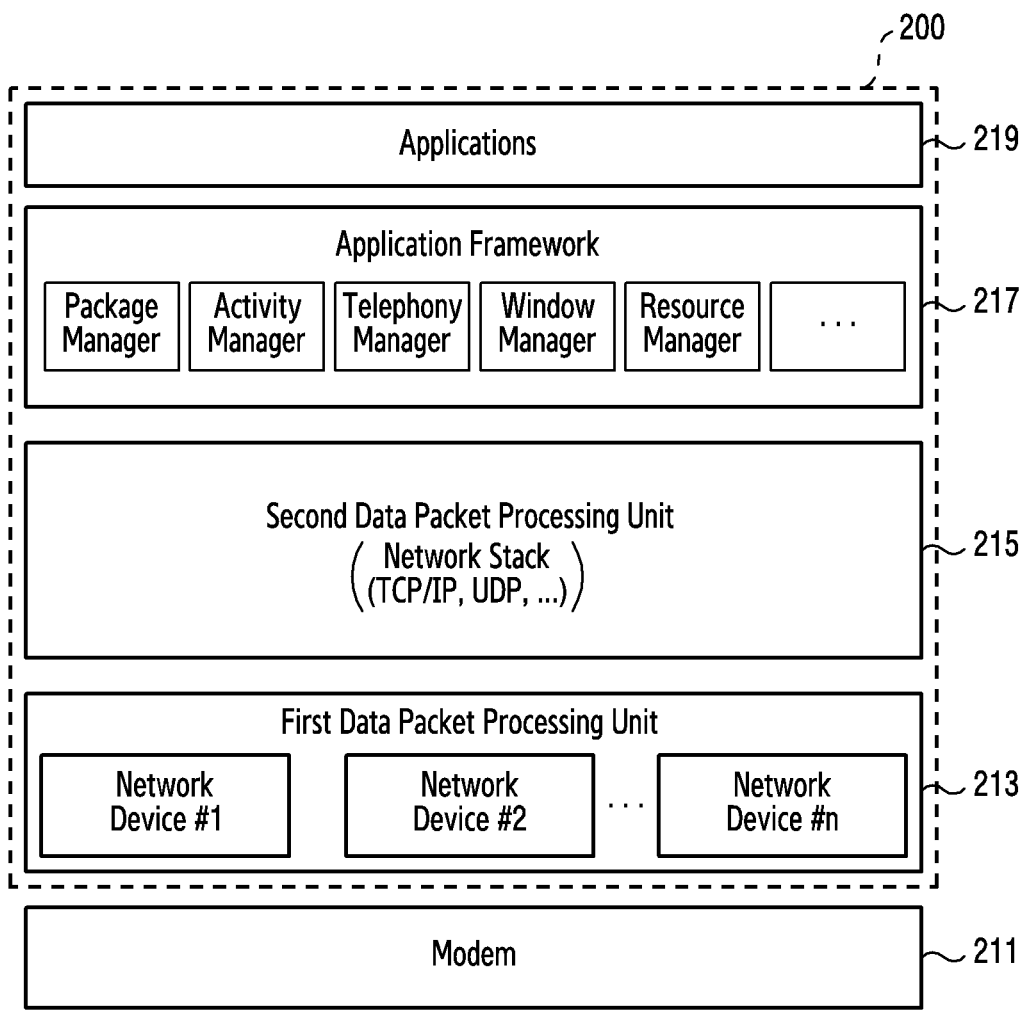
FIG. 2A illustrates a data packet processing operation of an electronic device according to an embodiment.
Figure 2B:
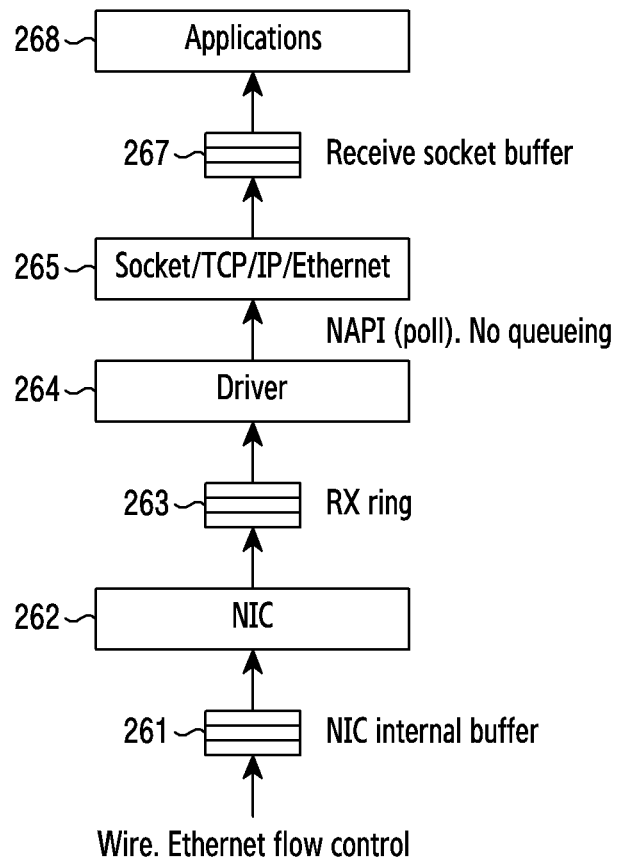
FIG. 2B illustrates the data packet processing operation of the electronic device according to an embodiment.

FIG. 2A illustrates a data packet processing operation of an electronic device according to an embodiment, and FIG. 2B illustrates the data packet processing operation of the electronic device according to an embodiment.

Referring to FIG. 2A, the electronic device may include a modem 211 and packet processing software 200. The packet processing software 200 may include a first data packet processing unit 213, a second data packet processing unit 215, an application framework 217, and applications 219. The packet processing software 200 may be stored in a memory 130, and may be executed in a processor 120. The first data packet processing unit 213 may include at least one network device (network device #1 to network device #n). For example, the second data packet processing unit 215 may be a network stack (transfer control protocol (TCP)/Internet protocol (IP) or a user datagram protocol (UDP). In FIG. 2A, the first data packet processing unit 213, the second data packet processing unit 215, and the application framework 217 may be included in middleware 144. The modem 211 may be configured by hardware.

The processor 120 of the electronic device may be a multi-core processor including a plurality of CPU cores in one chip (CPU chip). For example, an octa-core processor may include eight (8) cores. The multi-core processor may include a low-performance core (little core) which consumes less power and a high-performance core (big core) which consumes much power. The little core and the big core may use the same memory region, and tasks may be dynamically assigned between the big core and the little core according to the situation. In the following description, the core may be used as a term including the meaning of a processor core or a core.

An AP 120 may receive data packets via the modem 211 and may transmit data packets via the modem 211. The modem 211 may support 5G mobile communication and may be included in a CP 123. The AP of the electronic device may transmit data packets to an external electronic device 102, 104 or a server 108 via the modem 211, and may receive data packets transmitted from the external electronic device or the server.

The applications 219 may be driven on an operating system 143 controlling resources related to the electronic device and/or an operating system. The operating system may include Android™, Linux™, iOS™, Windows™, Symbian™, Tizen™, or Bada™. The application framework 217 may provide a function that is required by the applications 219 in common, or may provide various functions of enabling the applications 219 to use restricted system resources in the electronic device to the applications 219.

The applications 219 of the electronic device may transmit and receive data packets via the application framework 217 and the second data packet processing unit 215. The second data packet processing unit 215 may include a network layer, such as TCP, UDP, or IP. The second data packet processing unit 215 may transmit data packets to the modem 211 via the first data packet processing unit 213, or may receive data packets from the modem 211. The first data packet processing unit 213 may include device drivers of network devices, such as a modem, a local area network (LAN) card, Bluetooth®, near field communication (NFC), wireless fidelity (Wi-Fi), a display, audio, or a video.

For example, FIG. 2A illustrates a structure of a kernel including the second data packet processing unit 215, such as a network stack, and the first data packet processing unit 213, such as a net device driver. Data packets received via the modem 211 may move up to the network stack by the network device driver of the kernel, and the applications 219 on an upper layer may use corresponding packets.

The first data packet processing unit 213 (network device) in the kernel may operate in a new application program interface (API) (NAPI) or netif_rx method. The netif_rx method may process received data packets every time an interrupt occurs. The NAPI method may switch to a polling mode when an interrupt is received, and may process a predetermined number of data packets at a time. When the interrupt is received, the first data packet processing unit 213 may acquire as many data packets as napi_weight from the modem 211, and may release resources, such as process cores, and then may wait for the next scheduling.

A method for processing received data packets may include transmitting, by the first data packet processing unit 213, data packets from a network interface card (NIC) buffer to a network device buffer (Rx queue) every time a hardware interrupt request (HW IRQ) (an interrupt informing the processor of reception of data at the modem 211) occurs, inserting, by the first data packet processing unit 213, processed data packets to backlog queues of respective cores of the second data packet processing unit 215, and reading, by the second data packet processing unit 215, data packets stored in the backlog queues, and performing network stack processing. The backlog queue refers to a queue that waits for connection to a network stack, such as a TCP, and may be assigned to the memory.

The first data packet processing unit 213 in the kernel may simplify processing when receiving a hardware interrupt, and may complete the other portion of the data packet processing by using software interrupt processing (bottom half).

FIG. 2B illustrates a relationship among buffers related to reception of data packets. Data packets received at the processor from the modem 211, such as via a peripheral component interconnect express PCI-E (peripheral component interconnect-express) interface, may be stored in an internal reception buffer of the NIC 262 (NIC internal buffer 261). The NIC 262 may store the data packets in a ring buffer 263, such as a received queue. For example, the NIC 262 may receive data packets and may transmit the data packets to the internal reception buffer 261 or a designated ring buffer 263 according to network driver setting. The NIC 262 may generate a HW IRQ and may inform the processor of reception of the data packets, and the processor may perform software interrupt processing (softirq) with respect to a corresponding network driver. The reception buffer may refer to a queue that may wait for connection to a network device, and may be assigned to the memory 130.

A driver 264, such as the first data packet processing unit 213, may process the packets stored in the ring buffer through a protocol (socket/TCP/IP/Ethernet) process (265) and may transmit the packets to an upper layer, such as the second data packet processing unit 215. When an NAPI is used, there may not be a buffer between the driver 262 and the upper layer. The upper layer may directly access the packets stored in the ring buffer 263. Payload data of the data packet processed in the upper layer may be stored in a received socket buffer 267. An application 268 may access data in the socket buffer 267. A driver 264 that does not support the NAPI may store data packets in a backlog queue of the upper layer. The backlog queue may be in a waiting state in which a connection request is not completely processed. The backlog setting may be a maximum value of a connection queue that is pending for a reception awaiter, and when the backlog queue is full, an additional socket request may be rejected. In a method for processing a network stack in multiple cores, the backlog queue may be assigned to each processor core. The upper layer may process data packets stored in the backlog queue and may store the data packets in a socket queue.

Figure 3:
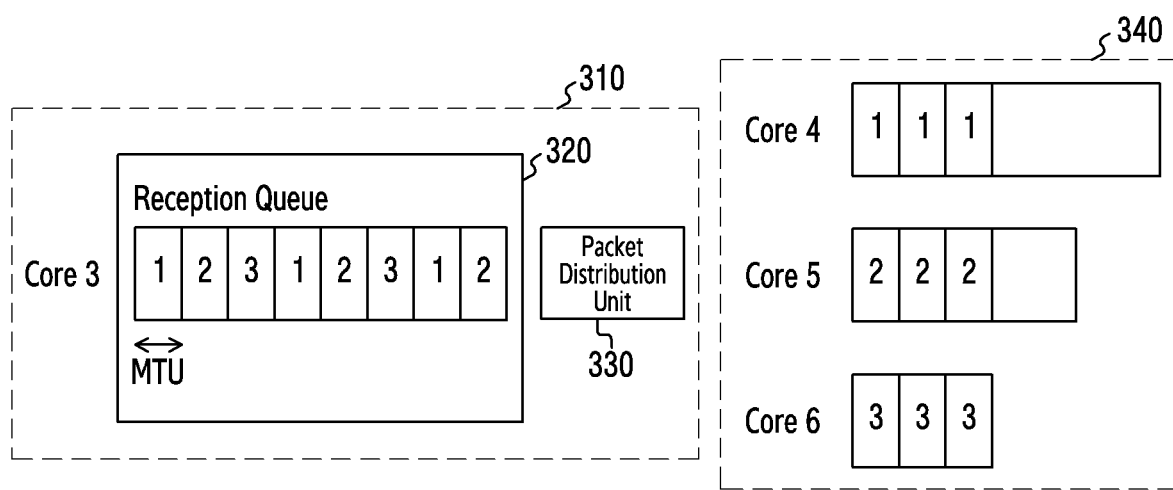
FIG. 3 illustrates a data packet processing operation of an electronic device according to an embodiment.

FIG. 3 illustrates a data packet processing operation of an electronic device according to an embodiment.

Referring to FIG. 3, the electronic device may include a first data packet processing unit 310 and a second data packet processing unit 340. The first data packet processing unit 310 may be a network device driver, and may include a reception queue 320 and a packet distribution (received packet steering) unit 330. Numbers "1," "2," "3" in the reception queue 320 and the second data packet processing unit 340 may indicate examples of information of TCP/IP headers of the received packets. A core may merge packets having the same header information into one packet based on the GRO technique.

When a processor receives data packets from a modem, the processor may receive an interrupt. That is, the modem may generate an HW IRQ in an NIC card to inform an AP of reception of data packets. A CP may transmit as many data packets of a maximum transmission unit (MTU) as desired and then may generate the interrupt request (IRQ). For example, a maximum of 330 data packets may be stored in a buffer before one IRQ is generated.

The data packets received along with the HW IRQ from the CP may enter (may be stored) in storage spaces classified by data type, such as inter-process communication (IPC) data, network packet data, or record file system (RFS) data. For example, the NIC and/or the first data packet processing unit 310 may analyze headers of the data packets stored in the modem buffer. When the data packets are IPC data, the data packets may be delivered to an appropriate program module, such as a radio interface layer (RIL), and when the data packets are network packet data, that is, Internet packet data received from a network, the data packets may be delivered to the second data packet processing unit 340, such as a TCP/UDP/IP layer. In FIG. 3, an operation of the first data packet distribution unit 310 may be performed by core 3.

The first data packet processing unit 310 may include the reception queue 320 and the packet distribution unit 330. In the case of network data packets, the first data packet processing unit 310 may distribute and deliver the data packets to a plurality of cores of the second data packet processing unit 340 in the RPS technique. A policy of distributing may be classifying received data packets according to a set condition, such as an IP address, a PORT number, or a random value (first data packet processing), and transmitting the classified data packets to corresponding cores of the second data packet processing unit 340 (network stack). For example, the first data packet processing unit 310 may designate/reply to a currently available core, such as a core of the second data packet processing unit, according to each data packet, and may assign/insert a corresponding data packet to an appropriate backlog queue, such as a backlog queue designated only for a corresponding core. For example, in FIG. 3, core 3 may merge network data packets having header information of "1", deliver the merged network data packets to core 4, merge network data packets having header information of "2", deliver the merged network data packets to core 5, merge network data packets having header information of "3", and deliver the merged network data packets to core 6.

When a designated software interrupt, such as NET_RX IRQ is generated, the second data packet processing unit 340 may process data packets stored in each buffer and may deliver the data packets to an upper layer (socket/application). For example, the second data packet processing unit 340 may analyze IP headers of the data packets, identify options regarding the IP packets, and determine a next path of the data packets. The packets distributed and delivered by the first data packet processing unit 310 may be processed according to a software interrupt context, such as NET_RX context, designated for each core of the second data packet processing unit 340. The network data packets may be distributed and processed in the respective cores of the second data packet processing unit 340 previously set by the distribution policy, such as the RPS technique, of the first data packet processing unit 310. The second data packet processing unit 340 may prevent the network data packet from converging on a specific CPU core, cause various cores to process the data packets in parallel, and process large data packets without delay.

A 5G mobile communication system may lack core resources even when distributing and processing data packets according to RPS. The GRO method may refer to a technique by which a network device driver (first data packet processing unit 310) merges continuous packet data having the same IP/TCP header information into one packet, such as a maximum 64 Kbyte, when receiving network data packets, and may move the packet data up to a network stack.

Figure 4:
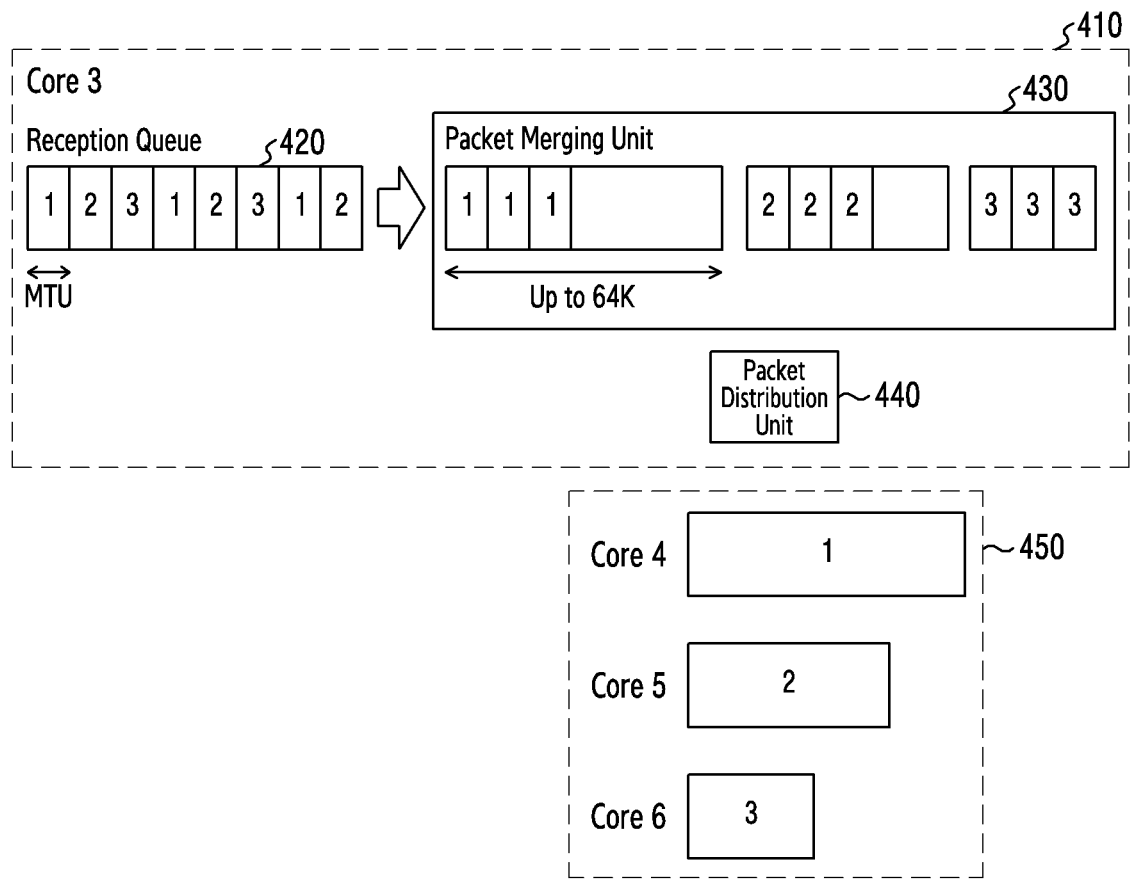
FIG. 4 illustrates a data packet processing operation of an electronic device according to an embodiment.

FIG. 4 illustrates a data packet processing operation in an electronic device according to an embodiment.

Referring to FIG. 4, the electronic device may include a first data packet processing unit 410 and a second data packet processing unit 450. The first data packet processing unit 410 may include a reception queue 420, a packet merging unit 430, and a packet distribution unit 440. For example, numbers "1," "2," "3" in the reception queue 420, the packet merging unit 430, and the second data packet processing unit 450 may indicate examples of TCP/IP header information of received packets. The packet merging unit 430 may merge packets having the same header information into one packet based on the GRO technique. For example, operations of the first data packet processing unit 410 may be performed in core 3.

Received data packets may be stored in the reception queue 420 of the first data packet processing unit 410. The packet merging unit 430 may analyze the data packets in the reception queue 420 and may merge continuous data packets into one packet, by analyzing headers of the data packets and merging data packets having the same IP/TCP header information into one packet. The packet merging unit 410 may cause cores of the second data packet processing unit 450 to process the data packets having the same IP/TCP headers. For example, the packet merging unit 430 may merge network data packets having header information of "1" into a first data packet, may merge network data packets having header information of "2" into a second data packet, and may merge network data packets having header information of "3" into a third data packet. The packet distribution unit 440 may distribute the first data packet, the second data packet, and the third data packet merged in the packet merging unit 430, and may deliver the data packets to designated buffers of cores 4, 5, and 5 of the second data packet processing unit 450.

The designated buffers may be corresponding backlog queues of cores 4, 5, and 6 of the second data packet processing unit 450. The data packet stored in the designated buffer may be one packet into which the data packets having the same header information are merged by a GRO function.

The second data packet processing unit 450 operating in the designated cores may perform network stack processing, such as TCP protocol and/or IP protocol, with respect to the packets entering the backlog queues, and may deliver the packets to an upper layer, such as a socket layer.

The GRO function may be performed in a CPU context, such as core 3, being the first data packet processing unit 410, and operations of the second data packet processing unit 450 may be performed in the same way as the previous operations. When the GRO method is used, the number of data packets processed in the second data packet processing unit 450 can be reduced, and the second data packet processing unit 340 can reduce time required to process each data packet. When data packets are processed, the network device driver can reduce time required to process packets at the network stack by merging the received data packets based on the GRO method. When the GRO function is used, the number of acknowledgements transmitted to a CP from an AP can be reduced, thereby reducing a load of the CP and time required to process network data packets at the AP.

When the GRO function is used, time required to process packet at the second data packet processing unit 450 can be reduced, but time required to process the first data packet at the first data packet processing unit 410 may increase. When the GRO function is performed for an excessive period of time, the time occupied by GRO may be a bottleneck in the total time required to process data.

Figure 5:
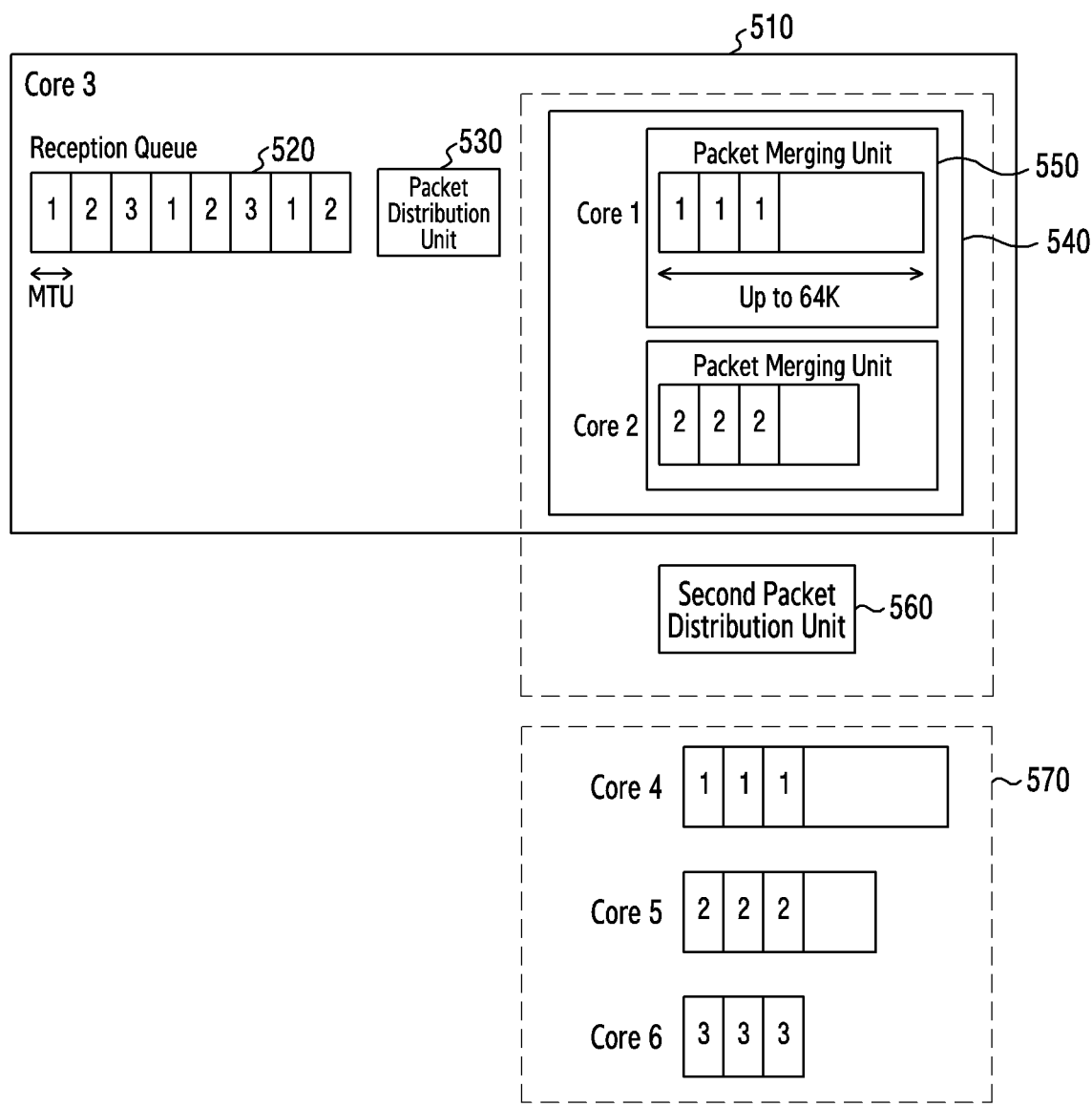
FIG. 5 illustrates a data packet processing operation of an electronic device according to an embodiment.

FIG. 5 illustrates a data packet processing operation of an electronic device according to an embodiment.

Referring to FIG. 5, the electronic device may include a first data packet processing unit 510 and a second data packet processing unit 570. The first data packet processing unit 510 may include a reception queue 520, a first packet distribution unit 530, a packet merging unit 540, and a second packet distribution unit 560. For example, numbers "1," "2," "3" in the reception queue 520, the packet merging unit 540, and the second data packet processing unit 570 may indicate examples of header information of received packets. The packet merging unit 540 may merge packets having the same header information into one packet based on the GRO technique. For example, operations of the reception queue 520 and the first packet distribution unit 530 may be performed in core 3, operations of the packet merging unit 540 may be performed in cores 1 and 2, and operations of the second data packet processing unit 570 may be performed in cores 4 to 6.

According to operations of the first data packet processing unit 510, the reception queue 520 may store data packets received via a modem. The electronic device may perform the GRO function in a core 1 or 2 different from core 3 where the first data packet processing unit operates. The first packet distribution unit 530 may analyze the data packets stored in the reception queue 520 and may distribute and deliver the data packets to a designated CPU of the packet merging unit 540. The electronic device may perform the GRO function in a plurality of cores 1 and 2. For example, the first packet distribution unit 530 may analyze the data packets stored in the reception queue 520, and may distribute and deliver the data packets to the designated CPU core of the packet merging unit 540. The first packet distribution unit 530 may analyze the data packets stored in the reception queue 520, determine whether to select activation of the GRO function, designate, when the activation of the GRO function is selected, at least one core to perform the GRO function for the data packets, and deliver the data packets to the core. For example, a packet flow which is not determined to use the GRO function may be delivered to the second data packet processing unit 570.

The second packet distribution unit 560 may analyze the data packets and may distribute and deliver the data packets to a designated CPU core of the second data packet processing unit 570, which may perform the same operation as the packet distribution unit 330 of FIG. 3 and the packet distribution unit 440 of FIG. 4.

The first data packet processing unit 510 of FIG. 5 may distribute and process data packets by independently configuring a configuration to read out data packets from the reception queue 520 and the first packet distribution unit 530, and a configuration to process GRO (the packet merging unit 540 and the second packet distribution unit 560). For example, the first data packet processing unit 510 may include a core to read out data packets from the reception queue 510, analyze the packets, determine whether to perform GRO, and determine a CPU core to perform GRO (first RPS function), and at least one core to perform GRO and a second RPS function. In addition, the first data packet processing unit 510 may drive a plurality of GROs, and may perform GRO of data packets in the plurality of CPU cores. The first packet distribution unit 530 may filter and classify the data packets of the reception queue 520, and may store the data packets in respective GRO buffers.

For example, the first packet distribution unit 530 may distribute the data packets based on header information of the data packets, and may operate to deliver network data packets having header information of "1" to core 1 which performs a packet merging operation, to deliver network data packets having header information of "2" to core 2, and to deliver network data packets having header information of "3" to the second packet distribution unit 560. Core 1 of the packet merging unit 540 may merge the network data packets having the header information of "1" into a first data packet, and may merge the network data packets having the header information of "2" into a second data packet. The second packet distribution unit 560 may distribute and deliver the first data packet and the second data packet which are merged in the packet merging unit 540, and the third data packets which are delivered from the first packet distribution unit 530 to designated respective buffers of cores 4, 5, and 6 of the second data packet processing unit 450.

The first packet distribution unit 530 of the first RPS function may be a core distribution module which classifies the packets stored in the reception queue and distributes the packets to at least one core performing the GRO function, and the second packet distribution unit 560 of the second RPS function may be a core distribution module which classifies the data packets processed (merged) by the GRO technique and distributes the data packets to at least one core for a network stack.

The first data packet processing unit 510 may determine a CPU core to perform the GRO function in the first packet distribution unit 530 prior to delivering the data packets stored in the reception queue 520 to the packet merging unit 540. The CPU core of the packet merging unit 540 may include at least one CPU core determined by the first packet distribution unit 530. The packet merging unit 540 may merge the data packets through the CPU core determined by the first packet distribution unit 530. The first data packet processing unit 510 may reduce the time required to process, which is added by GRO, such as operating time of core 3. For example, the first data packet processing unit 510 may reduce the time required to process by a network device layer when the GRO operation is independently performed, that is, 1.6 msec per data packets, such as 330 packets transmitted at a time, by about 10%, that is, to 1.4 msec, and accordingly, TCP DL TP may increase by about 10%, that is, from 1.4 Gbps to 1.5 Gbps.

The processor of the electronic device may include a plurality of cores including a high-performance core, such as a big core, and a low-performance core, such as a little core, according to a processing rate. For example, when the processor includes eight (8) cores (octa core), the processor may include four high-performance cores and four low-performance cores. The electronic device may designate the maximum number of cores to perform the GRO function of the packet merging unit 540 of the first data packet processing unit 510, and/or the maximum number of cores to process the second data packet processing unit 570. For example, the second packet distribution unit 560 of the first data packet processing unit 510 may designate two or three cores to distribute and process data packets in the second data packet processing unit 570. The first data packet processing unit 510 may designate an additional core to distribute and process by GRO.

The electronic device may designate a core to determine whether to perform the GRO function and a core to perform the GRO function. For example, when it is determined that the electronic device is in a GRO bottleneck state, such as when excessive time is required to process GRO, when another core processing task is performed in a corresponding core, or when the amount of packets entering from the reception queue 631 per hour is greater than or equal to a threshold value, the core performing the first RPS function, such as a first core, may designate other cores to process GRO, such as a second core, a third core, and so on, during runtime, and may cause the cores to perform the GRO function in a distributed manner.

When the bottleneck state in the GRO processing is released while the electronic device is processing GRO in the distributed manner (the second core or a plurality of cores are forming GRO), the CPU core performing the first RPS function may perform the GRO function, while the other cores do not perform GRO. For example, when the time required to process by GRO is reduced or is expected to be reduced because only one socket (port) is opened in the network stack, the electronic device may not perform GRO in the distributed manner.

The first packet distribution unit 530 of the electronic device may determine/change the number of CPU cores to be used in the packet merging unit 540 and the second packet distribution unit 560. For example, the electronic device may determine the number of cores to process GRO in the distributed manner according to the number of sockets (ports) used in the second data packet processing unit 570. When the maximum number of cores available in the network driver is 5 and the number of currently activated sockets is 3, the electronic device may set the number of cores to process GRO in the distributed manner to 3, such as the second core, the third core, and a fourth core, and may set the other two cores for the second data packet processing unit 570, such as network stack cores.

That is, the electronic device may give priority to the cores to process GRO. For example, when the maximum number of cores available in the network driver is 5 and the number of currently activated sockets is 2, the electronic device may set the number of CPU cores to process GRO in the distributed manner to 2, such as the second and third cores, and may set the other three cores to CPU cores of the second data packet processing unit 570. For example, in FIG. 5, core 3 may be the first core, core 1 may be the second core, core 2 may be the third core, and cores 4 to 6 may be network stack cores.

The electronic device may re-designate the core designated as a core for processing GRO, as a network stack core of the second data packet processing unit 570, or may designate another core in an idle state as a network stack core. The electronic device may give priority to the cores for performing GRO to be able to process GRO rapidly, or may give priority to the cores for processing the second data packet.

The electronic device may determine a type of a core to be used in the first data packet processing unit 510 and a type of a core to be used in the second data packet processing unit 570. For example, the electronic device may assign a higher performance core to process GRO, and may assign a low performance core to process the second data packet. Data packets having the same information, such as a packet header, may be merged in the packet merging unit 540 of the first data packet processing unit 510, such that the reduced number of data packets can be delivered to the second data packet processing unit 570. Accordingly, a load of the network stack core of the second data packet processing unit 570 can be reduced. Accordingly, a low-performance core may be assigned as a network stack core of the second data packet processing unit 570. For example, the first data packet processing unit 510 of the electronic device may monitor an amount of data packets entering each port and may re-assign different types of cores to the packet merging unit 540.

Figure 6A:
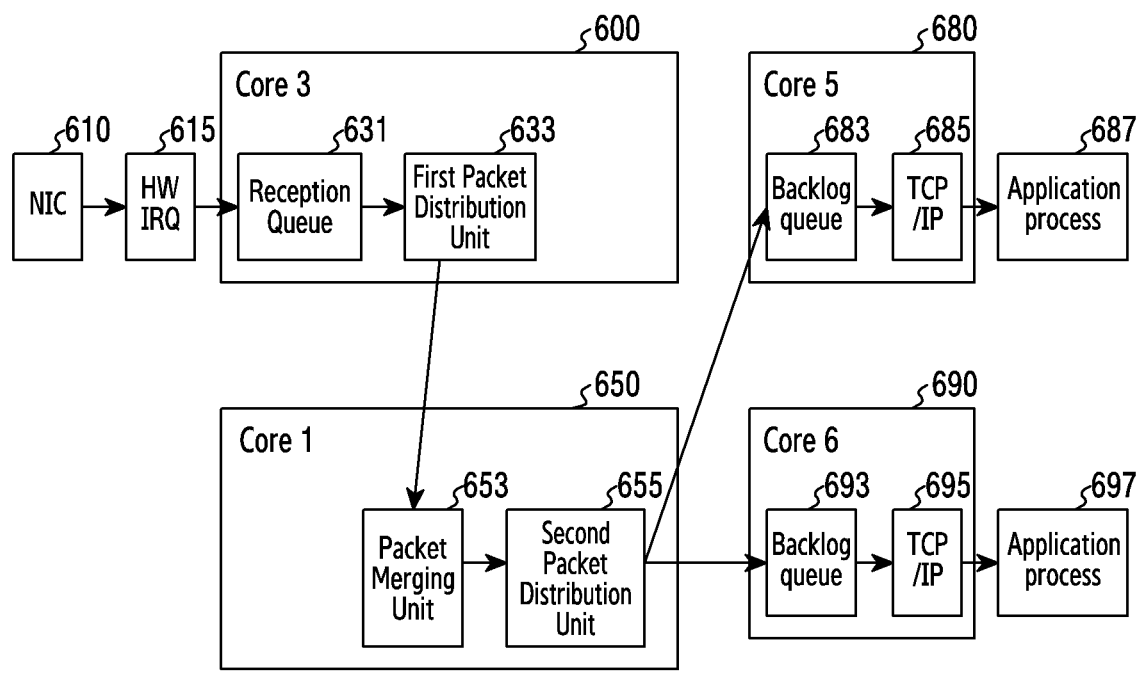
FIG. 6A illustrates a first example of processing data packets in an electronic device according to an embodiment.
Figure 6B:
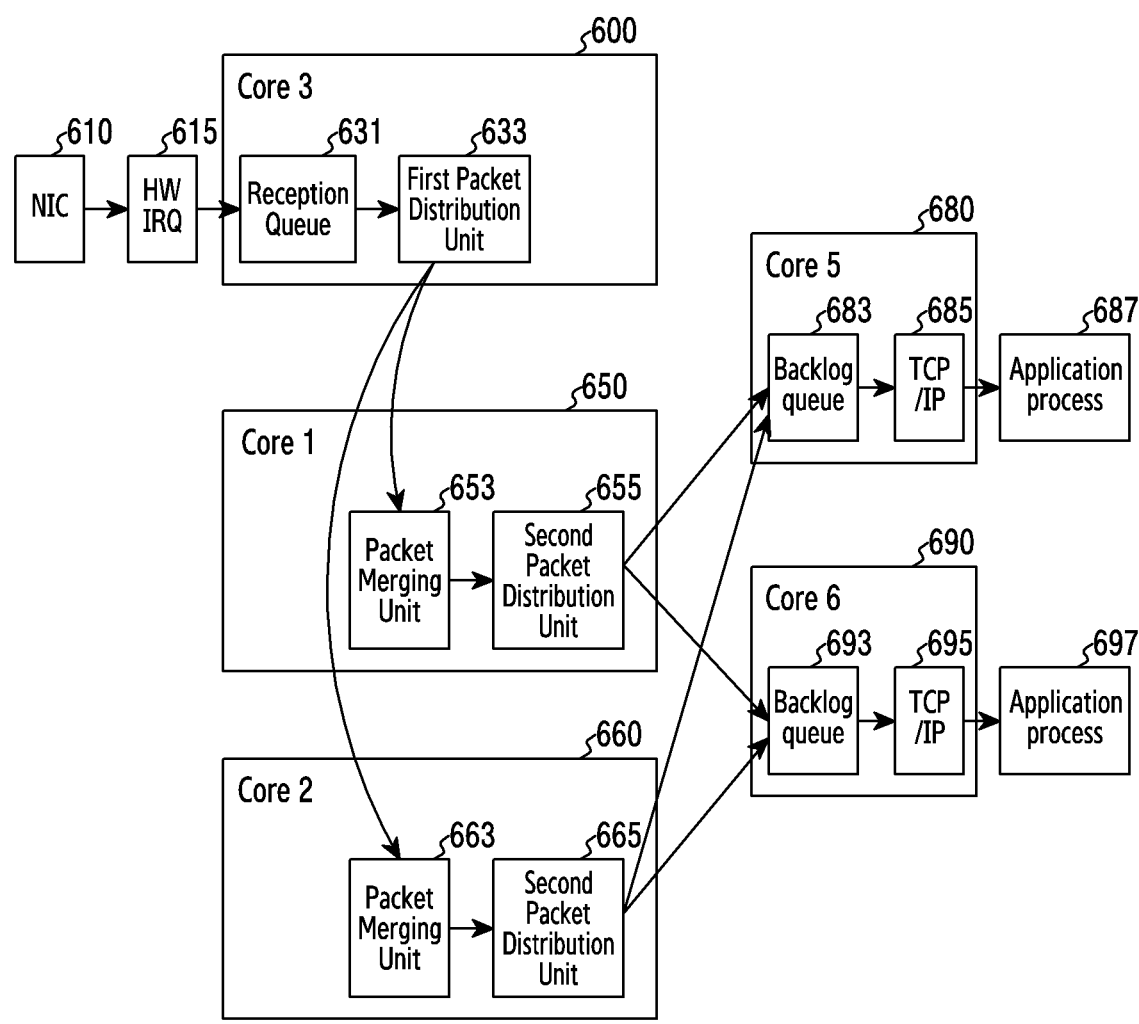
FIG. 6B illustrates a second example of processing data packets in an electronic device according to an embodiment.
Figure 6C:
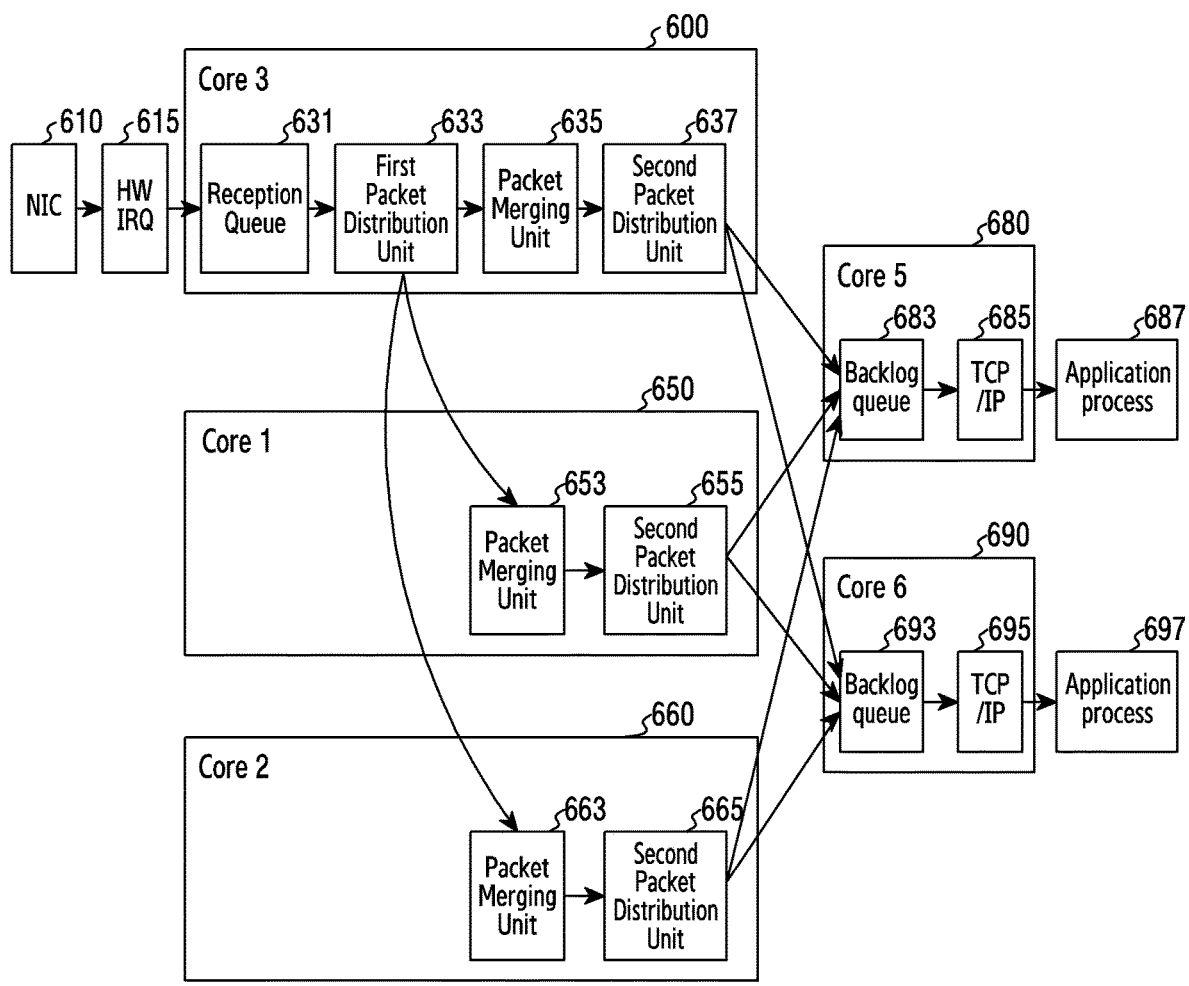
FIG. 6C illustrates a third example of processing data packets in an electronic device according to an embodiment.
Figure 6D:
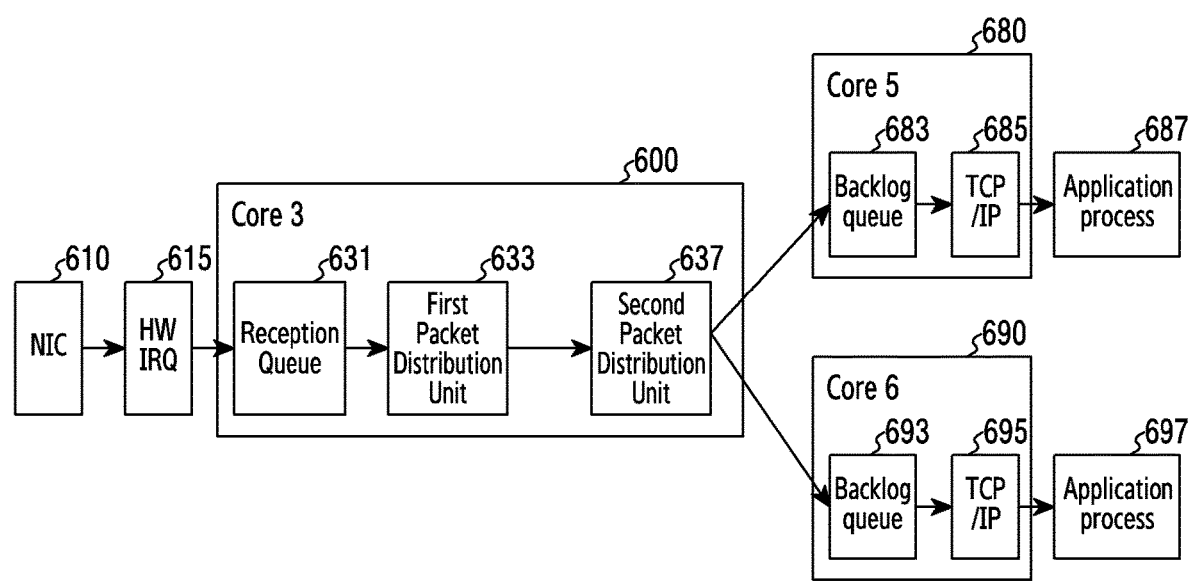
FIG. 6D illustrates a fourth example of processing data packets in an electronic device according to an embodiment.

FIG. 6A illustrates a first example of processing data packets in an electronic device according to an embodiment, FIG. 6B illustrates a second example of processing data packets in the electronic device according to an embodiment, FIG. 6C illustrates a third example of processing data packets in the electronic device according to an embodiment, and FIG. 6D illustrates a fourth example of processing data packets in the electronic device according to an embodiment. A processor may include a plurality of core processors, such as cores 1 to 6 of FIG. 5, which may execute an interrupt handler context, such as the $1^{st}$ NETRX context to the $2^{nd}$ NETRX context, according to a hardware interrupt and/or a software interrupt.

The electronic device processing data packets may include a first data packet processing unit 510, and a second data packet processing unit 570. The first data packet processing unit may include a first core to perform a first RPS function and at least one core, such as a part or all of the second core to the N-th core, to perform GRO and a second RPS function.

The first RPS function may refer to classifying packets stored in a reception queue and distributing the packets to the at least one core performing the GRO function. The second RPS function may refer to classifying the data packets processed (merged) by the GRO technique, and distributing the data packets to at least one core for a network stack. The second data packet processing unit may include at least one network stack core designated in the first data packet processing unit, and the network stack core may process the data packets delivered from the first data packet processing unit and may deliver the data packets to an upper layer.

Referring to FIG. 6A, the first core 600 may be core 3, and may include a reception queue 631 to store received data packets and a first packet distribution unit 633.

An NIC 610 may be a modem interface of the processor, which may be electrically connected with a modem via a designated interface, such as a PCI-E interface and/or a shared memory interface, and may transmit or receive data to or from the modem via the NIC interface. The NIC 610 may transmit data packets delivered from the modem to a host memory buffer assigned in advance by the first data packet processing unit, such as a network driver, and may inform an operating system (driver) of an interrupt (HW IRQ).

The first core 600 may include the reception queue 631 to store received data packets and the first distribution unit 633. When the HW IRQ is received at the processor, the processor may execute an interrupt handler operating in the first core. The reception queue 631 may store the received data packets. The first packet distribution unit 633 may determine a core to deliver the data packets prior to delivering the data packets to cores performing GRO, such as the second core to the N-th core. When it is determined that GRO processing is currently in a bottleneck state, such as when excessive time is required to process GRO or another core processing task is performed in a corresponding CPU core, the first packet distribution unit 633 may determine at least one core to process GRO during runtime, and may distribute and process the data packets. The first packet distribution unit 633 may determine or change the number of cores for GRO based on the number of sockets used in the second data packet processing unit, and may determine types of cores.

The second core 650, such as core 1 in FIG. 6A, may include a packet merging unit 653 and a second packet distribution unit 655. FIG. 6A illustrates an example in which CPU core 650 performs GRO. The packet merging unit 653 may analyze the data packets stored in the reception queue 631 and may merge data packets having the same information into one data packet. The second packet distribution unit 655 may distribute and deliver the merged data packets to backlog queues 683, 693 of respective network stack cores 680, 690 of the second data packet processing unit.

The second data packet processing unit may include at least one network stack core. FIG. 6A illustrates an example of two network stack cores 680, 690, wherein the network stack core 680 may include the backlog queue 683, a TCP/IP processing unit 685, and an application processing unit 687. The network stack core 690 may include the backlog queue 693, a TCP/IP processing unit 695, and an application processing unit 697. The backlog queues 683, 693 may be reception network queues of the corresponding network cores 680, 690. The TPC/IP processing units 685, 695 may perform network TCP/IP processing with respect to the data packets stored in the corresponding backlog queues 683, 695 based on information (IP/PORT information), and may deliver the data packets to socket buffers. The application processing units 687, 697 may read data from the sockets.

The first core 600 may receive first data packets having a first size delivered from the modem and may store the first data packets in the reception queue 631. The first core 600 may deliver at least a portion of the first data packets stored in the reception queue 631 to the second core 650. For example, the first packet distribution unit 633 of the first core 600 may analyze a processing state of GRO, and, when the data packets are in a bottleneck state, may designate the second core 650 and deliver all or a portion of the received data packets to the second core. For example, when it is determined that an amount of packets incoming from the reception queue 631 per hour is large, the first packet distribution unit 633 of the first core 600 may designate the second core 650 and may deliver all or a portion of the received data packets to the second core.

The second core 650 may receive at least a portion of the first data packets from the first core 600, and may merge at least a portion of the received first data packets into a plurality of second data packets having sizes larger than the first size, based at least in part on the type of the first data packets. The second core 650 may transmit the second data packets to at least one other core 680, 690 of the processor than the first core and the second core. For example, the second core 650 may include a packet merging unit 653 and a second packet distribution unit 655, and the packet merging unit 653 may identify, based on packet header information, the types of the received first data packets, and may generate the second data packets by merging the data packets of the same type. The second packet distribution unit 655 may store the second data packets merged in the packet merging unit 653 in the corresponding backlog queues 683, 693 of the network stack cores 680, 690.

Referring to FIG. 6B, a first data packet processing unit may include a first core 600 (core 3), a second core 650 (core 1), and a third core 660 (core 2). The first core 600 may include a reception queue 631 and a first packet distribution unit 633. The second core 650 and the third core 660 may include packet merging units 653, 663 and second packet distribution units 655, 665, respectively. A second data packet processing unit may include network stack cores 680, 690 having backlog queues 683, 693 and TCP/IP processing units 685, 695, respectively. The network stack core 680 may be core 5 and the network stack core 690 may be core 6.

The first core 600 may transmit a portion of the received data packets having a first size to the second core 650, and may transmit the other portion of the first data packets to the third core 660. The second core 650 may receive at least a portion of the first data packets from the first core 600, and may merge at least a portion of the received first data packets into a plurality of second data packets having sizes larger than the first size, based at least in part on the type of the first data packets. The second core 650 may transmit the second data packets to at least one other core 680, 690 of the processor than the first core 600 to the third core 660. The third core 660 may receive the other portion of the first data packets from the first core 600, and may merge the other portion of the first data packets into a plurality of third data packets having sizes larger than the first size, based at least in part on the types of the data packets. The third core 660 may transmit the third data packets to at least one other core 680, 690 of the processor than the first core 600 to the third core 660.

Referring to FIG. 6C, a first data packet processing unit may include a first core 600 (core 3), a second core 650 (core 1), and a third core 660 (core 2). The first core 600 may include a reception queue 631, a first packet distribution unit 633, a packet merging unit 635, and a second packet distribution unit 637. The second core 650 and the third core 660 may include packet merging units 653, 663 and second packet distribution units 655, 665, respectively. A second data packet processing unit may include network stack cores 680, 690 having backlog queues 683, 693, and TCP/IP processing units 685, 695, respectively. The network stack core 680 may be core 5 and the network stack core 690 may be core 6.

The first core 600 may transmit a portion of the received data packets having a first size to the second core 650, and may transmit the other portion of the first data packets to the third core 660. The first core 600 may further perform a GRO function and a second RPS function. The first core 600 may merge the other portion of the first data packets into a plurality of fourth data packets having sizes larger than the first size, based at least in part on the types of the data packets. The first core 600 may transmit the fourth data packets to at least one other core 680, 690 (network stack core) different from the first core 600 to the third core 660. Operations of the second core 650 and the third core 660 may be the same as the operations in FIG. 6B.

The backlog queues 683, 693 of the network stack cores 680, 690 may store the fourth data packets transmitted from the first core 600, the second data packets transmitted from the second core 650, and the third data packets transmitted from the third core 660. The network cores 680, 690 may process the second data packets, the third data packets, and the fourth data packets, and may deliver the data packets to sockets.

In FIGS. 6A, 6B, and 6C, at least one core of the first core 600, the second core 650, and the third core 660 may perform a large receive offload (LRO) process, and may merge the first data packets into at least one of the merged data packets, such as the second, third, or fourth data packets, by using at least a portion of the LRO process, which re-merges received packets (first data packets) into larger packets (smaller number of packets) to deliver the same to a network stack of a system.

Referring to FIG. 6D, when time required to process by GRO is minimal and thus distributed processing of data packets is not required, a first data packet processing unit 600 may disable the GRO function. The first core 600 may include a reception queue 631, a first packet distribution unit 633, and a second packet distribution unit 637. When the GRO function is disabled, the first core 600 may transmit first data packets having a first size to at least one other core 680, 690 of the processor than the first core 600.

The first core of the electronic device may perform the first RPS function and may determine at least one core based on capacities of data packets and core balancing. For example, the first core may determine the second core to the N-th core as shown in FIGS. 6A, 6C, and 6C and may perform GRO and the second RPS function. As shown in FIG. 6C, the first core may be determined as a core performing the GRO and the second RPS function.

According to various embodiments, an electronic device may include a wireless communication modem, at least one processor connected with the communication modem and including a plurality of cores, and a nonvolatile memory operatively connected with the processor. When being executed, the nonvolatile memory may store instructions that cause a first core of the processor to receive first data packets having a first size from the wireless communication modem, and to transmit at least a portion of the first data packets to a second core of the processor, and that cause the second core to receive the at least portion of the first data packets from the first core, to merge the at least portion of the first data packets into a plurality of second data packets having sizes larger than the first size, based at least in part on a type of the first data packets, and to transmit the second data packets to at least one other core of the processor than the first core and the second core.

The instructions may cause the first core to transmit the other portion of the first data packets to a third core of the processor, and cause the third core to receive the other portion of the first data packets from the first core, to merge the other portion of the first data packets into a plurality of third data packets having sizes larger than the first size, based at least in part on the type, and to transmit the third data packets to the at least one other core.

The instructions may cause the first core to merge the other portion of the first data packets into a plurality of fourth data packets having sizes larger than the first size, based at least in part on the type, and to transmit the fourth data packets to the at least one other core.

The instructions may cause at least one of the first core, the second core, and the third core to perform an LRO process, and to merge the first data packets into at least one of the second data packets, the third data packets, and the fourth data packets by using at least a portion of the LRO process.

The electronic device may include a kernel system, such as Linux or Unix kernel system, as an operating system, and the instructions may cause the processor to perform a GRO process provided by the kernel system and including substantially the same process as at least a portion of the LRO process.

According to various embodiments, an electronic device may include a wireless communication modem, and at least one processor operatively connected with the communication modem and including a plurality of cores, a first data packet processing unit configured to process received data packets and to store the data packets in backlog queues, and a second data packet processing unit configured to process the data packets stored in the backlog queues and to deliver the data packets to an upper layer. The first data packet processing unit may include a first core configured to receive first data packets having a first size from the wireless communication modem, and to transmit at least a portion of the first data packets to a second core of the processor, and the second core configured to receive the at least portion of the first data packets from the first core, to merge the at least portion of the first data packets into a plurality of second data packets having sizes larger than the first size, based at least in part on a type of the first data packets, and to transmit the second data packets to at least one network stack core.

The first data packet processing unit may further include a third core. The first core may transmit the other portion of the first data packets to the third core of the processor, and the third core may receive the other portion of the first data packets from the first core, may merge the other portion of the first data packets into a plurality of third data packets having sizes larger than the first size, based at least in part on the type, and may transmit the third data packets to at least one other network stack core.

The first core may merge the other portion of the first data packets into a plurality of fourth data packets having sizes larger than the first size, based at least in part on the type, and may transmit the fourth data packets to the at least one other network stack core.

At least one of the first core, the second core, and the third core may perform an LRO process, and may merge the first data packets into at least one of the second data packets, the third data packets, or the fourth data packets by using at least a portion of the LRO process.

The electronic device may include a kernel system as an operating system, and the first core may perform a GRO process provided by the kernel system and including substantially the same process as at least a portion of the LRO process.

The first core may include a reception queue to receive the first data packets of the first size, and a first packet distribution unit (receive packet steering unit) to determine the at least one second core to process GRO based on a time required to process data packets.

The second core may include a GRO unit to merge the first data packets having the same information into the second data packets, based on information of the first data packets delivered from the first core, and a second packet distribution unit to store the merged second data packets in a backlog queue of the at least one network stack core.

When the time required to process the data packets is excessive, the first packet distribution unit may further designate a third core to merge the first data packets, and the third core may include a GRO unit to receive the other portion of the first data packets from the first core, and to merge the other portion of the first data packets into a plurality of third data packets having sizes larger than the first size, based at least in part on the type, and a second packet distribution unit configured to distribute and transmit the third data packets to a backlog queue of at least one other network stack core.

The first core may further include a GRO unit to merge the other portion of the first data packets into a plurality of fourth data packets having sizes larger than the first size, based at least in part on the type, and a second packet distribution unit configured to transmit the fourth data packets to the at least one other network stack core.

At least one of the first core, the second core, and the third core may perform an LRO process, and may merge the first data packets into at least one of the second data packets, the third data packets, or the fourth data packets by using at least a portion of the LRO process.

Figure 7:
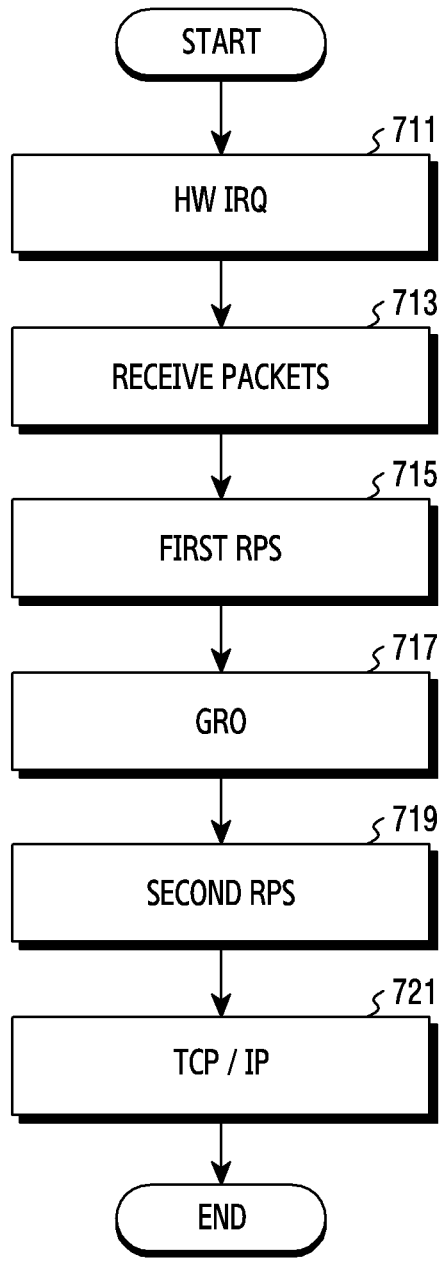
FIG. 7 illustrates a data packet processing operation of an electronic device according to an embodiment.

FIG. 7 illustrates a data packet processing operation of an electronic device according to an embodiment.

Referring to FIG. 7, when data packets are received from a modem and an interrupt is received in step 711, the electronic device may execute an interrupt handler. In step 713, the electronic device may store the packets received by the interrupt in divided storage spaces based on types of data. In step 715, the electronic device may determine a core to merge the data packets by performing a first RPS function, which may be performed in a first core. In step 717, the electronic device may merge first data packets of the same information having a first size by performing a GRO function. The merged data packets may have a size larger than the first data packets having the first size. In step 719, the electronic device may distribute and transmit the merged data packets by performing a second RPS function. For example, the electronic device may distribute the merged data packets to backlog queues of network stack cores and may store the data packets therein. The electronic device may process the merged data packets stored in the backlog queues and may deliver the data packets to sockets. For example, in step 721, the electronic device may identify and process (network TCP/IP processing) information (IP/PORT information) of the merged data packets stored in the backlog queues, and may deliver the data packets to socket buffers.

The first core of the electronic device may receive the first data packets having the first size from the modem and may transmit at least a portion of the received first data packets to the second core, which may receive the at least portion of the first data packets from the first core and may merge at least a portion of the received first data packets into a plurality of second data packets having sizes larger than the first size, based at least in part on the type of the first data packets. The second core may store the merged second data packets in at least the backlog queue of the network stack core.

Figure 8:
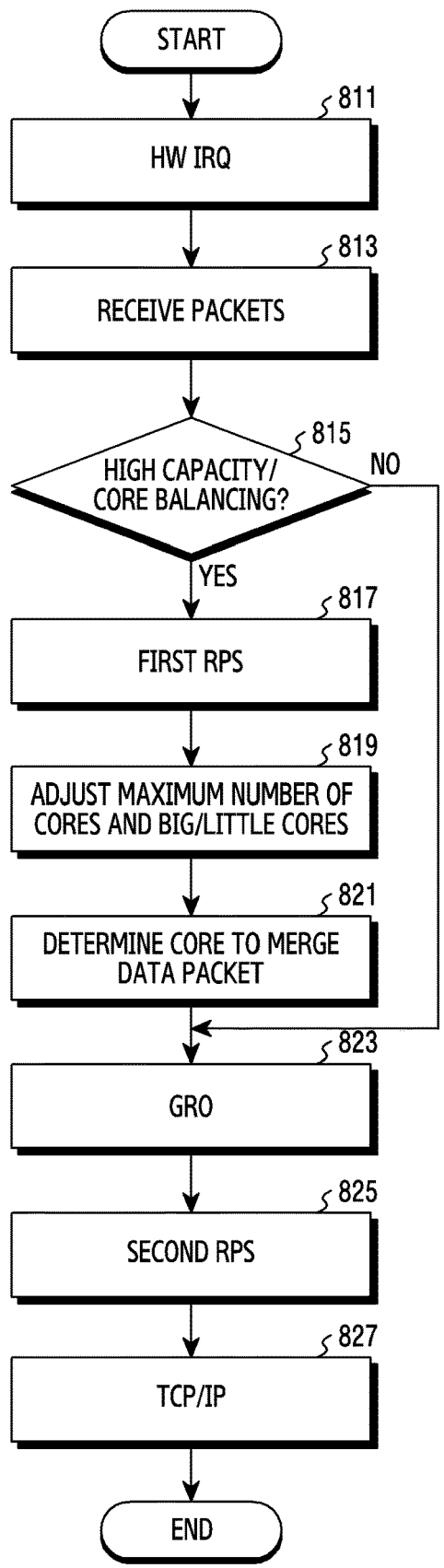
FIG. 8 illustrates an operation of processing data packets based on a processing state of received data packets in an electronic device according to an embodiment.

FIG. 8 illustrates an operation of processing data packets based on a processing state of received data packets in an electronic device according to an embodiment.

Referring to FIG. 8, when a HW IRQ is generated in step 811, the electronic device may receive data packets In step 813. In step 815, the electronic device may analyze a processing state of the data packets. For example, the electronic device may identify the processing state of the data packets based on capacities (high capacity) of the data packets and core balancing. When the data packets have high capacities, such as when an amount of packets entering for a predetermined time is greater than or equal to a threshold value, or core balancing is required, the electronic device may proceed to step 817 to perform a first RPS function. In step 819, the electronic device may store the number of cores to perform a GRO function and types of the cores (big core, little core) based on the processing state of the data packets. In step 821, the electronic device may determine a core to merge the data packets. In step 823, the electronic device may perform the GRO function to merge the first data packets of the same information having the first size. The merged data packets may have sizes larger than the first data packets. In step 825, the electronic device may perform a second RPS function to distribute and transmit the merged data packets. For example, the electronic device may distribute the merged data packets to backlog queues of network stack cores, and may store the data packets therein. When the data packets does not have high capacities or core balancing is not required in step 815, the electronic device may proceed to operation 823 to perform the second RPS function. In step 827, the electronic device may identify and process (network TCP/IP processing) information (IP/PORT information) of the merged data packets stored in the backlog queues, and may deliver the data packets to socket buffers.

According to various embodiments, a method for processing data packets of an electronic device may include a first data packet processing operation of distributing received data packets and storing the data packets in backlog queues, and a second data packet processing operation of processing the data packets stored in the backlog queues and delivering the data packets to an upper layer. The first data packet processing operation may include receiving, by a first core, first data packets having a first size from a wireless communication modem, and transmitting at least a portion of the first data packets to a second core of a processor, and receiving, by the second core, the at least portion of the first data packets from the first core, merging the at least portion of the first data packets into a plurality of second data packets having sizes larger than the first size, based at least in part on a type of the first data packets, and storing the second data packets in a backlog queue of at least one network stack core.

The first data packet processing operation may further include transmitting, by the first core, the other portion of the first data packets to a third core of the processor, and receiving, by the third core, the other portion of the first data packets from the first core, merging the other portion of the first data packets into a plurality of third data packets having sizes larger than the first size, based at least in part on the type, and storing the third data packets in a backlog queue of at least one other network stack core.

The first data packet processing operation may further include merging, by the first core, the other portion of the first data packets into a plurality of fourth data packets having sizes larger than the first size, based at least in part on the type, and storing the fourth data packets in a backlog queue of at least one other network stack core.

The first data packet processing operation may further include performing, by at least one of the first core, the second core, or the third core, an LRO process, and merging the first data packets into at least one of the second data packets, the third data packets, or the fourth data packets by using at least a portion of the LRO process.

In the first data packet processing operation, the at least one of the first core, the second core, or the third core may perform a GRO process provided by a system, and including substantially the same process as at least a portion of the LRO process.

When processing large packets or processing data packets by applying GRO, the electronic device may determine at least one core to perform GRO based on a processing state of data prior to transmitting the data packets to a network stack. The electronic device can distribute the operations of a CPU in a network device driver, and thus can minimize a delay in processing data packets.

As used herein, the term "module" may include a unit implemented in hardware, software, or firmware, and may interchangeably be used with other terms, such as "logic," "logic block," "part," or "circuitry". A module may be a single integral component, or a minimum unit or part thereof, adapted to perform one or more functions, and may be implemented in a form of an application-specific integrated circuit (ASIC).

Embodiments as set forth herein may be implemented as software including one or more instructions that are stored in a storage medium that is readable by a machine. For example, a processor of the machine may invoke at least one of the one or more instructions stored in the storage medium, and execute the instructions with or without using one or more other components under the control of the processor, thus enabling the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" indicates that the storage medium is a tangible device, and does not include a signal (e.g., an electromagnetic wave), but does not differentiate between where data is semi-permanently or temporarily stored in the storage medium.

A method according to embodiments of the disclosure may be included and provided in a computer program product, which may be traded as a product between a seller and a buyer. The computer program product may be distributed in the form of a machine-readable storage medium (e.g., compact disc read only memory (CD-ROM)), or downloaded or uploaded online via an application store or directly between two user devices. If distributed online, at least part of the computer program product may be temporarily generated or stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be performed sequentially, in parallel, repeatedly, or heuristically, one or more of the operations may be executed in a different order or omitted, or one or more other operations may be added.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for processing data packets of an electronic device, the method comprising:
    a first data packet processing operation of distributing received data packets and storing the data packets in backlog queues; and
    a second data packet processing operation of processing the data packets stored in the backlog queues and delivering the data packets to an upper layer,
    wherein the first data packet processing operation comprises:
    receiving, by a first core of a processor, first data packets having a first size from a wireless communication modem, and transmitting at least a portion of the first data packets from the first core to a second core of the processor;
    receiving, by the second core, the at least portion of the first data packets from the first core, based at least in part on information corresponding to a header of the first data packets, merging the at least a portion of the first data packets into a plurality of second data packets having sizes larger than the first size, and storing the second data packets in a backlog queue of at least one network stack core;
    transmitting, by the first core, a remaining portion of the first data packets other than the at least a portion of the first data packets to a third core of the processor; and
    receiving, by the third core, the remaining portion of the first data packets from the first core, merging the other portion of the first data packets into a plurality of third data packets having sizes larger than the first size, based at least in part on the information, and storing the third data packets in a backlog queue of at least one other network stack core.

2. The method of claim 1, wherein the first data packet processing operation further comprises merging, by the first core, the remaining portion of the first data packets into a plurality of fourth data packets having sizes larger than the first size, based at least in part on the information, and storing the fourth data packets in a backlog queue of at least one other network stack core.

3. The method of claim 2, wherein the first data packet processing operation further comprises:
    performing, by at least one of the first core, the second core, and the third core, a large receive offload (LRO) process; and
    merging the first data packets into at least one of the second data packets, the third data packets, and the fourth data packets by using at least a portion of the LRO process.

4. The method of claim 3, wherein, in the first data packet processing operation, the at least one of the first core, the second core, and the third core is configured to perform a generic receive offload (GRO) process comprising an identical process as the at least a portion of the LRO process.

5. An electronic device comprising:
a wireless communication modem; and
at least one processor operatively connected with the communication modem and comprising a plurality of cores,
a first data packet processing unit configured to process received data packets and to store the data packets in backlog queues; and
a second data packet processing unit configured to process the data packets stored in the backlog queues and to deliver the data packets to an upper layer,
wherein the first data packet processing unit comprises:
a first core of the processor configured to receive first data packets having a first size from the wireless communication modem, and to transmit at least a portion of the first data packets to a second core of the processor;
the second core configured to receive the at least a portion of the first data packets from the first core, based at least in part on information corresponding to a header of the first data packets, to merge the at least portion of the first data packets into a plurality of second data packets having sizes larger than the first size, and to transmit the second data packets to at least one network stack core,
wherein the first core is further configured to transmit a remaining portion of the first data packets other than the at least a portion of the first data packets to the third core of the core processor, and
wherein the third core is configured to receive the remaining portion of the first data packets from the first core, to merge the remaining portion of the first data packets into a plurality of third data packets having sizes larger than the first size, based at least in part on the information, and to transmit the third data packets to at least one other network stack core.

6. The electronic device of claim 5, wherein the first core is further configured to merge the remaining portion of the first data packets into a plurality of fourth data packets having sizes larger than the first size, based at least in part on the information, and to transmit the fourth data packets to the at least one other network stack core.

7. The electronic device of claim 6, wherein at least one of the first core, the second core, and the third core is configured to perform a large receive offload (LRO) process, and to merge the first data packets into at least one of the second data packets, the third data packets, and the fourth data packets by using at least a portion of the LRO process.

8. The electronic device of claim 7, wherein the first core is further configured to perform a generic receive offload (GRO) process comprising an identical process as at least a portion of the LRO process.

9. The electronic device of claim 5, wherein the first core comprises:
a reception queue configured to receive the first data packets of the first size; and
a first packet distribution unit configured to determine the at least one second core to process GRO based on a time required to process data packets.

10. The electronic device of claim 9, wherein the second core comprises:
a generic receive offload (GRO) unit configured to merge the first data packets having the same information into the second data packets, based on information of the first data packets delivered from the first core; and
a second packet distribution unit configured to store the merged second data packets in a backlog queue of the at least one network stack core.

11. The electronic device of claim 10, wherein the first packet distribution unit is configured to, when a time required to process the data packets is excessive, further designate a third core to merge the first data packets, and
wherein the third core comprises:
a GRO unit configured to receive the remaining portion of the first data packets from the first core, and to merge the remaining portion of the first data packets into a plurality of third data packets having sizes larger than the first size, based at least in part on the information; and
a second packet distribution unit configured to distribute and transmit the third data packets to a backlog queue of at least one other network stack core.

12. The electronic device of claim 11, wherein the first core further comprises:
a GRO unit configured to merge the remaining portion of the first data packets into a plurality of fourth data packets having sizes larger than the first size, based at least in part on the information; and
a second packet distribution unit configured to transmit the fourth data packets to the at least one other network stack core.

13. The electronic device of claim 12, wherein at least one of the first core, the
second core, and the third core is configured to perform a large receive offload (LRO)process, and to merge the first data packets into at least one of the second data packets, the third data packets, and the fourth data packets by using at least a portion of the LRO process.

* * * * *